United States Patent [19]

Panuski

[11] 4,197,616
[45] Apr. 15, 1980

[54] SHOWER CURTAIN RETAINER

[76] Inventor: William R. Panuski, 2500 Oakside Dr., Bethlehem, Pa. 18017

[21] Appl. No.: 919,577

[22] Filed: Jun. 27, 1978

Related U.S. Application Data

[63] Continuation-in-part of Ser. No. 852,205, Nov. 17, 1977, abandoned.

[51] Int. Cl.² ............................................. F16B 47/00
[52] U.S. Cl. .................................... 24/73 R; 248/507; 248/206 R; 24/73 VA; 24/73 CH
[58] Field of Search ............... 248/507, 509, 510, 362, 248/363, 206 R, 500; 160/349 R; 211/89; 24/73 AS, 73 CH, 81 DS

[56] References Cited

U.S. PATENT DOCUMENTS

| | | | |
|---|---|---|---|
| 1,000,858 | 8/1911 | Ulrich | 248/206 R |
| 1,426,930 | 8/1922 | Waldron | 248/206 R |
| 1,546,042 | 7/1925 | Story | 248/206 R X |
| 2,303,502 | 12/1942 | Rous | 248/206 R X |
| 2,310,842 | 2/1943 | Davitt et al. | 24/73 CH |
| 2,505,899 | 5/1950 | Jube | 248/206 R |
| 3,704,563 | 12/1972 | Waller | 248/507 X |

FOREIGN PATENT DOCUMENTS

| | | | |
|---|---|---|---|
| 1016325 | 11/1952 | France | 248/206 R |
| 1369520 | 7/1964 | France | 248/206 R |
| 486013 | 5/1938 | United Kingdom | 248/206 R |
| 1433883 | 4/1976 | United Kingdom | 211/89 |

*Primary Examiner*—J. Franklin Foss
*Attorney, Agent, or Firm*—Howard I. Podell

[57] ABSTRACT

A base which can be attached to a wall adjacent to a tub holds a flat spring secured to the base, the distal end of which flat spring holds an end of a shower curtain firmly against the wall in order that dripping and splashing may be prevented as a result of the use of the shower. The flat spring has an arcuate tab on the underside of the distal end of the spring and a handle on the exterior side of the distal end of the spring in order that the spring may be manually lifted away from an engaged shower curtain to release the shower curtain from the wall as desired. A circular ring in the cap fixed to the proximal end of the spring engages a circular channel in the base to secure the cap, spring and base together with a pin in the cap passing through a hole in the proximal end of the spring and to engage a shaftway in the base to secure the spring, cap and base in engagement.

3 Claims, 12 Drawing Figures

U.S. Patent Apr. 15, 1980 Sheet 1 of 2 4,197,616
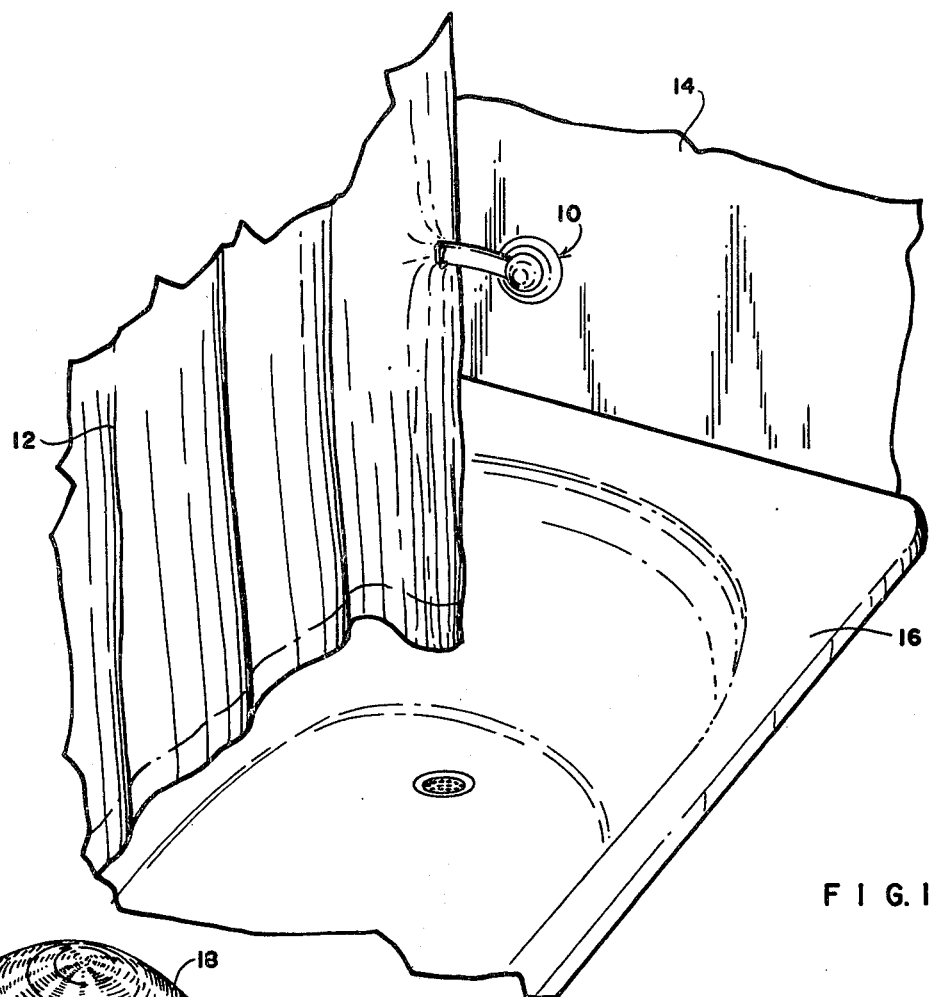
FIG. 1
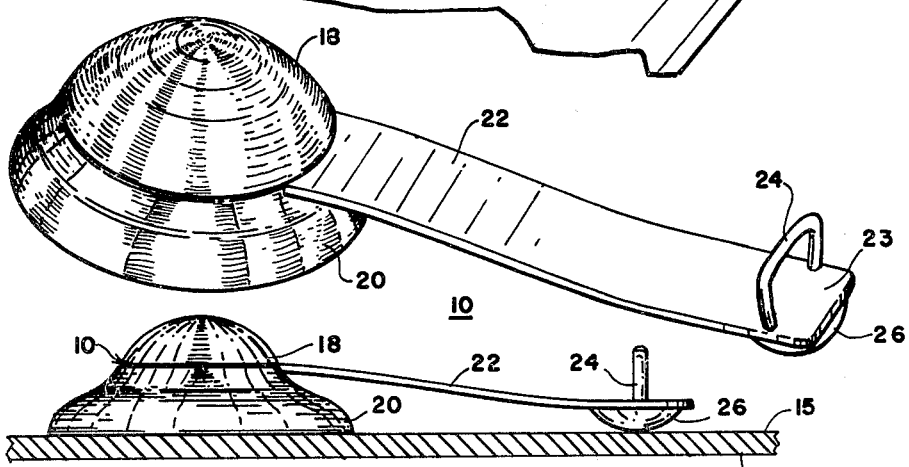
FIG. 2
FIG. 3
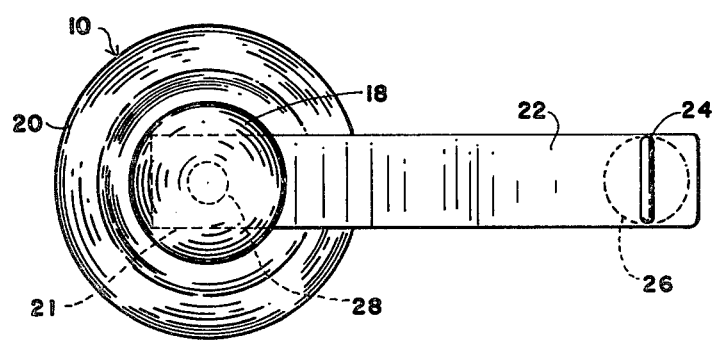
FIG. 4

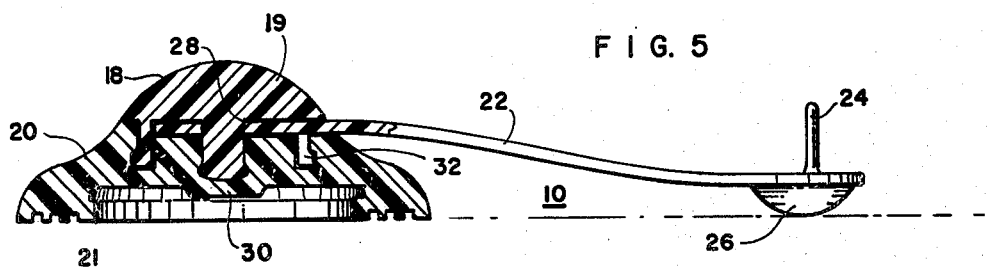
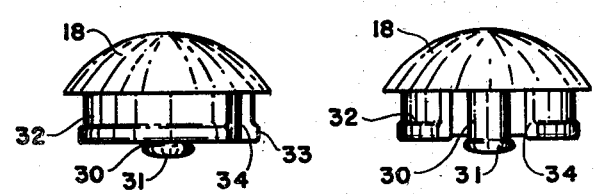
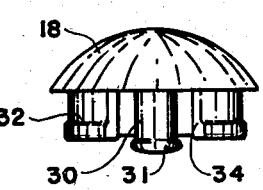
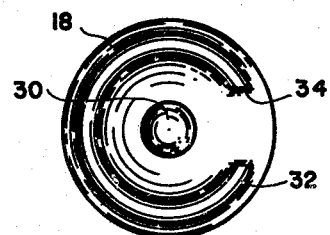
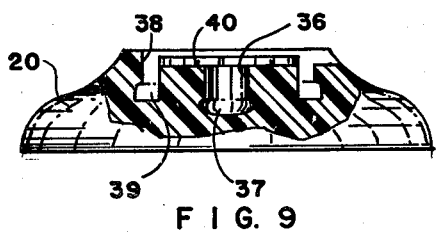
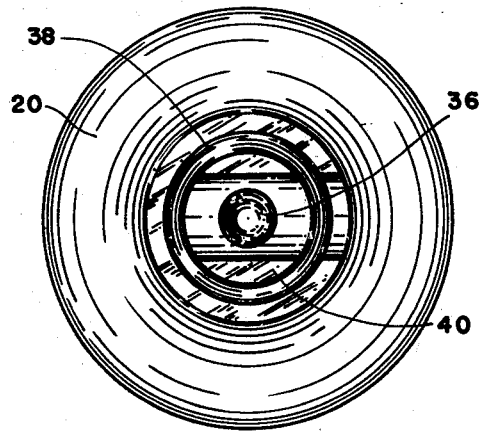
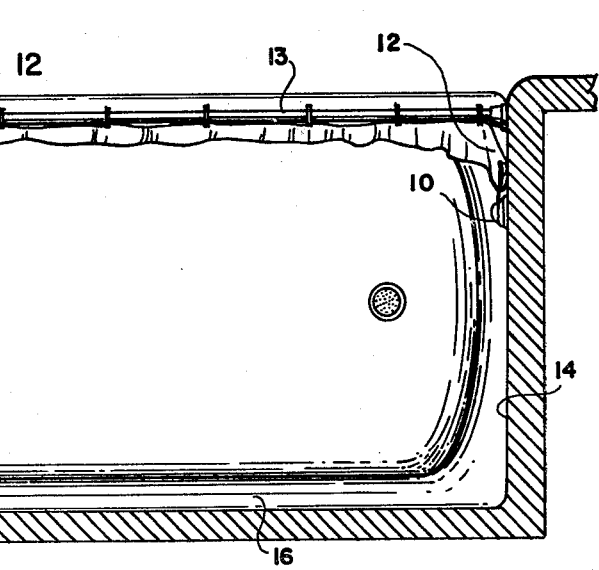

SHOWER CURTAIN RETAINER

This application is a continuation-in-part of patent application Ser. No. 852,205 filed by the same inventor on Nov. 17, 1977, which patent application is herewith abandoned.

SUMMARY OF THE INVENTION

I have invented a new and novel shower curtain retainer. My device may prevent the dripping and splashing of water when a shower is used. This clamping device uses the tension of a flat spring steel clamping strip covered with a synthetic rubber material to hold the end section of a shower curtain against the bathroom wall. My device can be mounted approximately four inches to twelve inches above the tub to secure the shower curtain to the wall at the end of the tub and may be permanently mounted using epoxy cement or other adhesive in the grooves in the bottom surface of the mounting. Alternatively, a screw mounting method may be applied. The cap of this device protects the attachment of the steel spring and can be removed for changing of the steel spring. The base of this shower curtain retainer may be made of a ceramic material.

BRIEF DESCRIPTION OF THE DRAWING

The objects and features of the invention may be understood with reference to the following detailed description of an illustrative embodiment of the invention, taken together with the accompanying drawings in which:

FIG. 1 is a perspective view of the device in use;
FIG. 2 is a perspective view of the device;
FIG. 3 is a side view of the device;
FIG. 4 is a top view of the device;
FIG. 5 is a cross sectional side view of the device;
FIG. 6 is a side view of the cap;
FIG. 7 is a front view of the cap;
FIG. 8 is a bottom view of the cap;
FIG. 9 is a side view in partial cross section of the base;
FIG. 10 is a front view of the base;
FIG. 11 is a top view of the base; and
FIG. 12 is a plan section view of a shower and tub well, with the device installed on each end wall of the tub well.

DESCRIPTION OF THE PREFERRED EMBODIMENT:

Turning now descriptiovely to the drawings, in which similar reference characters denote similar elements throughout the several views, FIGS. 1 and 12 illustrate the retainer 10 in use to hold an end section of a shower curtain 12 firmly against an end wall 14 of a tub well in which a tube is located with a shower head 15 mounted on one end wall 14 of the well so that curtain 12 hanging freely on curtain rod 13 is securely detachably anchored when the shower head is in use, against the two end walls 14 of the well of the retainer 10 to prevent shower water from being sprayed past either end section of the curtain 12.

FIGS. 2–11 illustrate the retainer 10 which is formed of a shaped flat spring member 22 detachably mounted at its proximal end 21 to a base 20 by a cap 18. A U-shaped handle 24 extends from the exterior surface of the distal end 23 of spring 22, with a curved convex tab 26 extending from the undersurface of the distal end 23, tab 26 serving to press a shower curtain sheet between tab 26 and a wall surface to which base 20 is permanently mounted, with spring member 22 shaped so as to force tab 26 with spring bias against the surface 15 of the wall 14 to which base 20 is fixed.

Spring member 22 is preferably formed of a metal strip encased in a flexible rubber or plastic coating.

Cap 18 is formed with an exterior convex dome section 19, with a central pin 30 extending from the underside of dome section 19 through a hole 28 in the proximal end of spring 22 into a shaftway 36 in the base 20. Pin 30 is formed with a projecting head section 31 that fits into the undercut end section 37 of shaftway 36 so as to secure the pin to the shaftway. Cap 18 is formed with an annular flange 32 that is shaped to fit into a concentric circular groove 38 in base 20, with flange 32 formed with a head section 33 that is engaged in an undercut end section 39 of groove 38. A section of flange 32 is cut away to provide an opening 34 through which spring 22 extends. A shaped slot recess 40 is formed extending from the exterior surface of base 20 of a size to fit about flat member 22 in the unslotted position.

Preferably, cap 18 is formed of a resilient rubber or plastic material so that head 31 of pin 30 may be of larger diameter than hole 28 of spring member 22 or the diameter of shaftway 36 and get present cap 18 to be detached as desired from base 20 and spring member 22, with flange head section 33 latched in the undercut section 39 of groove 38 so that cap 18 may bear against spring member 22 to maintain tab 26 biased towards and against a curtain between tab 26 and wall surface 15.

Handle 22 may be manually grasped to pull tab 26 away from wall 14 when it is desired to insert a curtain end section between the tab and the wall or when it is desired to remove the curtain from such engagement.

Base 20 may be formed with a roughened surface or its underside 21 or grooves may be formed extending from underside 21 to retain adhesive cement employed to fasten base 20 to a wall 14. Alternatively, base 20 may be fastened by screw means to wall 14. Base 20 may be formed of a resilient or a semi-rigid type of material.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. A shower curtain retainer device adaptable for detachably fastening an end section of a shower curtain against a wall to which the device is mounted comprising
    a base member adaptable for permanent fastening to a wall,
    a flat spring member fastened at its proximal end section to the base member so as to extend radically from said base member, said spring member shaped so that its distal end section bears against, under spring bias, a surface of the wall to which the base member is attached, such that
    an end section of a shower curtain may be detachably engaged between said distal end section of the spring member and the said wall surface, together with
    a cap member, said cap member being formed with means to detachably fasten the proximal end section of the spring member to the base member, wherein a pin is attached to the cap member and passes through a hole in the proximal end section of the spring member to engage a shaftway in the base member, wherein the cap has a circular flange formed with a front aperature attached to a bottom portion of the cap member and detachably engageable with a circular groove in the base member.

2. The retainer of claim 1, wherein the base member is formed with a horizontal slot in which the spring is mountable.

3. The combination as recited in claim 1, in which the cap member is formed of a resilient material.

* * * * *